| United States Patent [19] | [11] Patent Number: 4,818,211 |
| Weidman et al. | [45] Date of Patent: Apr. 4, 1989 |

[54] DIE SYSTEM FOR MAKING MANHOLE FRAME FOR SPHERICAL TANKS

[75] Inventors: William J. Weidman, Old Tappan, N.J.; Edmund Netz, Rego Park, N.Y.

[73] Assignee: Cardinal Tank Co., Brooklyn, N.Y.

[21] Appl. No.: 29,625

[22] Filed: Mar. 24, 1987

[51] Int. Cl.[4] .............................................. B29C 41/04
[52] U.S. Cl. ..................................... 425/425; 264/250; 264/311; 264/318; 425/402; 425/453; 425/DIG. 58
[58] Field of Search ............... 425/112, 116, 129, 402, 425/425, 429, 435, 451.9, 470, DIG. 58, 453; 264/250, 310, 311, 318; 249/137, 165, 176

[56] References Cited

U.S. PATENT DOCUMENTS

| 3,309,762 | 3/1967 | Harper | 264/311 |
| 3,783,060 | 1/1974 | Goldsworthy et al. | 264/311 |
| 4,705,468 | 11/1987 | LeBreton | 425/116 |

FOREIGN PATENT DOCUMENTS 2930365  2/1980  Fed. Rep. of Germany ...... 264/311

Primary Examiner—Jay H. Woo
Assistant Examiner—James Housel
Attorney, Agent, or Firm—Lackenbach Siegel Marzullo & Aronson

[57] ABSTRACT

A three piece die is provided for making an access-hole frame and includes a bottom die piece and two top pieces that are bolted together to form an integral top die piece that fits over the bottom die piece. The access-hole frame is formed using the three-piece die by placing the three-piece die in stages upon rotatable table and spraying the nonmetal moldable material onto the rotating bottom and top die pieces. The access-hole frame so produced may be used for the construction of a spherical tank made of nonmetal moldable material.

12 Claims, 5 Drawing Sheets

FIG. 5
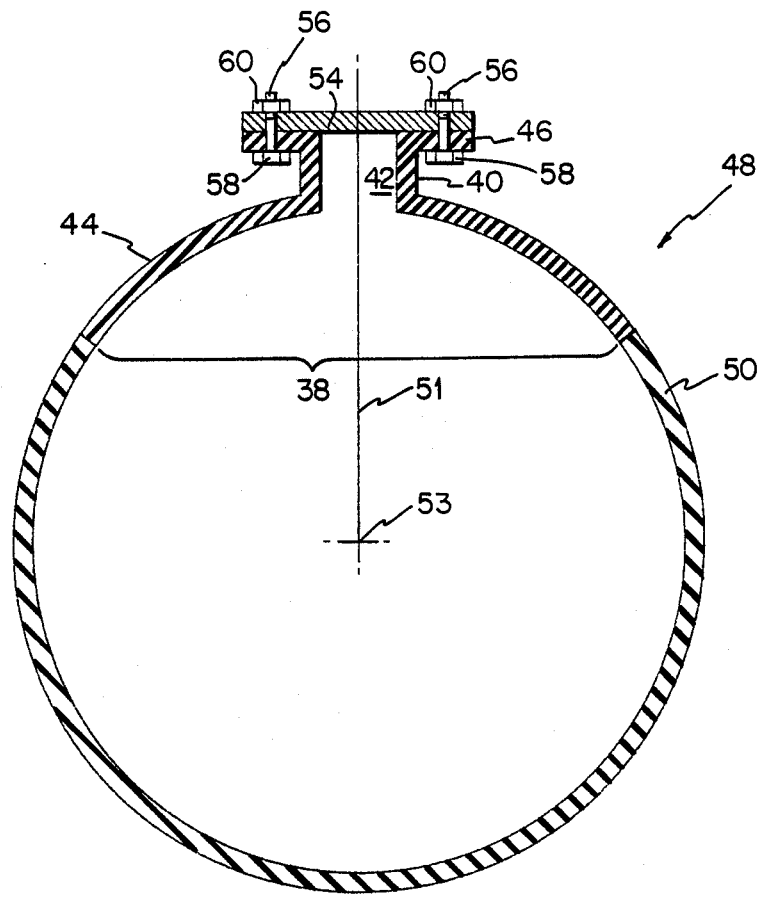
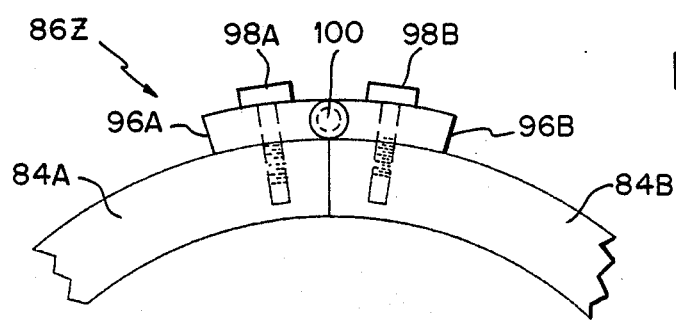
FIG. 9A
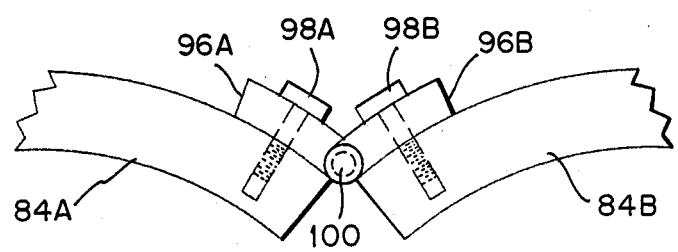
FIG. 9B

DIE SYSTEM FOR MAKING MANHOLE FRAME FOR SPHERICAL TANKS

FIELD OF THE INVENTION

This invention relates to spherical molded tanks made of nonmetal material, and in particular to manhole access frames for such spherical tanks.

BACKGROUND OF THE INVENTION

All closed containers or vessels have access openings to the internal parts of the vessels. The access openings are variously known as manholes, hatches, and so on. The manhole is formed by a manhole frame. The configuration of the manhole frame varies in accordance with the geometry of the tank.

The subject of the present invention is a manhole frame for a spherical tank of the type used for underground storage of fluid materials, typically petroleum products. Spherical tanks in the current art are generally made of a filament, generally fiberglass, which is wound around an inflatable and deflatable ball, or mandrel. Manhole frames are prepared in advance and then fitted over the inflated mandrel. The spherical tank is then formed by a glass strand roving process known in the art as filament winding that incorporates the manhole frame, which becomes an integral part of the formed spherical tank. After completion of the spherical tank, the mandrel is collapsed and withdrawn from the tank through the manhole.

The old art of producing manhole frames for spherical tanks, which were formerly made of steel as were the tanks, is generally followed in the current art even though the spherical tanks and their manhole frames are made of nonmetal moldable materials rather than of metal. Both the old art and the present art use injection molds, or dies, to produce the manhole frames.

Two basic types of manhole frames are known in the art. These types are shown in FIGS. 1 and 2, which are discussed in detail later. Both of these manhole frames follow the types used when spherical tanks were made of metal rather than fiberglass or plastic. The first type of manhole frame, which is illustrated in FIG. 1, includes a neck with a collar and bolts integral with the neck for later attachment with a closure plate. The bolts tend to loosen because of an inherent inability of the bolts to be firmly held by the resin that surrounds them with resultant leaking and maintenance expenses later. Another problem arises during molding when the resin tends to run downwardly onto the bolt threads. The second type of manhole frame, which is illustrated in FIG. 2, includes a neck connected to a manhole flange having bolt holes for bolts to be added later. This type of frame must be reinforced at the joint between the neck and the spherical tank by added spraying around the neck at added cost. Problems with leakage at the reinforcing arise with associated maintenance expenses.

SUMMARY OF THE INVENTION

Accordingly, it is an object of this invention to provide a manhole frame for spherical tanks formed with nonmetal moldable materials that overcomes the disadvantages of the prior art.

It is another object of this invention to provide a manhole frame for spherical tanks formed with nonmetal moldable materials which is inexpensive to manufacture and reduces the possibilities of subsequent leakage.

It is another object of this invention is to provide an inexpensive die for a manhole frame for spherical tanks formed with nonmetal moldable materials and which makes possible the production of the moldable manhole frame at a very low cost.

It is yet another object of this invention to provide an inexpensive method of manufacturing the manhole frame in accordance with the present invention.

Accordingly, in order to achieve the above objects and others that will become apparent hereafter, I have devised an inventive manhole frame made of nonmetal moldable material for spherical tanks that includes the advantageous features and excludes the disadvantageous features of the prior art discussed above. In addition, I have devised a inexpensive three-piece die that makes possible the formation of the inventive manhole frame at a very low cost. Also, in association with the three-piece die I have devised an inexpensive method of producing the inventive manhole frame. In particular, there is provided a manhole frame for the construction of a spherical tank made of nonmetal moldable material, the frame having a cylindrical neck, an outwardly extending flange at the top side of the neck, and a partly spherical collar to be integrated with the spherical wall of the tank. Bolt holes are drilled around the flange for bolts that hold a manhole cover to the manhole frame. A three-piece die provided for making the manhole frame includes a bottom die piece and two top pieces that are bolted together to form an operational top die piece that fits over the bottom die piece. The manhole frame is formed in accordance with a manufacturing process by placing the three-piece die in stages upon a rotatable table and spraying the nonmetal moldable material onto the rotating bottom and top die pieces.

The present invention will be better understood and the objects and important features, other than those specifically enumerated above, will become apparent when consideration is given to the following details and description, which when taken in conjunction with the annexed drawings, describes, discloses, illustrates, and shows a preferred embodiment or modification of the present invention and what is presently considered and believed to be the best mode of practice in the principles thereof. Other embodiments or modifications may be suggested to those having the benefits of the teachings herein and such other embodiments or modifications are intended to be reserved especially as they fall within the scope and spirit of the subjoined claims.

BRIEF DESCRIPTION OF THE DRAWINGS

FIG. 5 is a midsectional view of a formed spherical tank including the manhole frame shown in FIG. 3 integral with the tank;

FIG. 9A is a detail view of an alternate rotatable locking element of the top piece of the die in a closed mode; and FIG. 9B is a detail view of the locking element illustrated in FIG. 9A in an open mode.

DESCRIPTION OF THE PREFERRED EMBODIMENT

Figure 1:
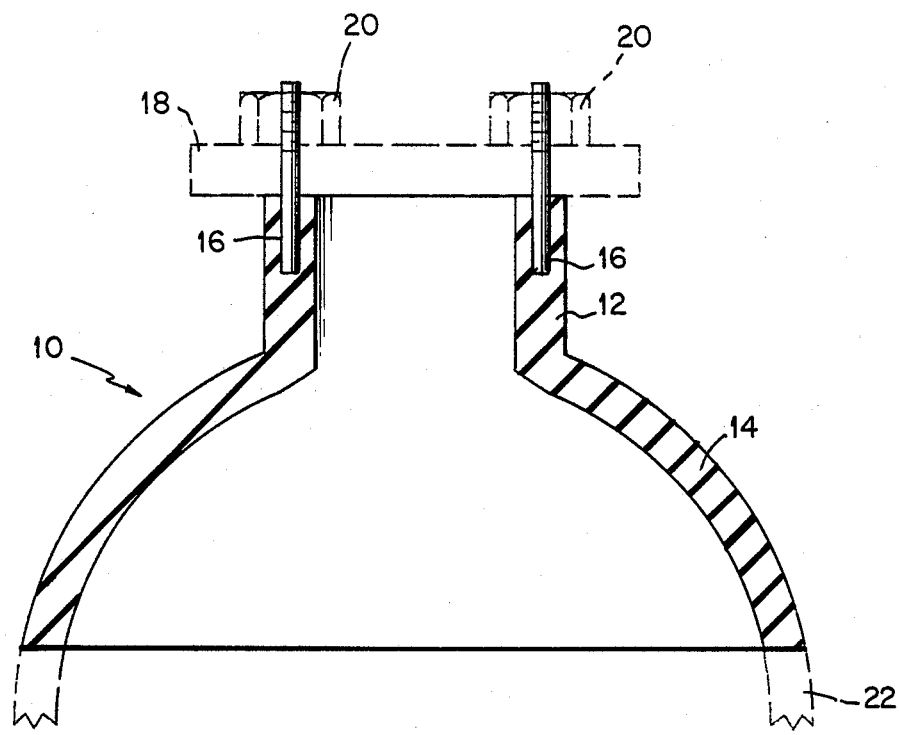
FIG. 1 is a sectional side view of a prior art manhole frame also illustrating a closure plate and a portion of a spherical tank in phantom line.

FIG. 1 illustrates a manhole frame 10 having a cylindrical neck 12 and a circular, curved collar 14 connected to the lower circular edge of neck 12. Collar 14 is dimensioned in accordance with the dimensions of the spherical tank with which it will become integral. A plurality of bolts 16 embedded at equal distances in neck 12 extend upwardly from the edge of the neck. A removable, cylindrical manhole cover, or closure plate, 18, is secured to neck 12 by nuts 20 after the completion of the finished spherical tank 22, all shown in phantom line. Manhole frame 10 is made with a one-piece die that forms neck 12 and collar 14 in a position inverted from the orientation shown in FIG. 1. There are several problems associated with this prior art. One problem is that bolts 16 ar difficult to orient in a straight upward orientation with consequent problems in maintenance as time goes by since bolts 16 tend to loosen. Another problem is that bolts 16 are not well bonded in neck 12 since they are held in place by plastic, not by steel as in the old art. Also, resin being spray applied to the one-piece die tends to run downwardly into the threads of bolts 16 so as to interfere subsequently with screwing on of nuts 20; this problem can be alleviated, but only with extra labor and expense.

Figure 2:
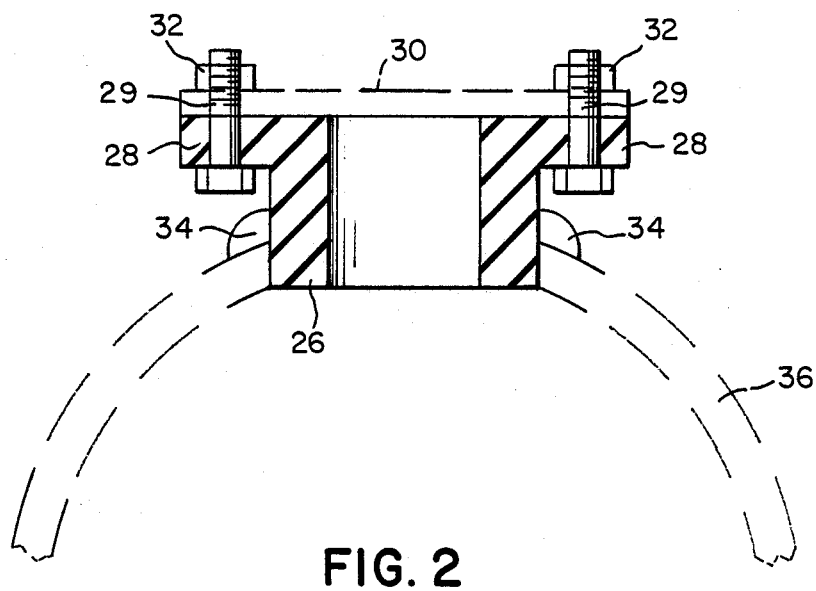
FIG. 2 is a sectional side view of a prior art manhole frame also illustrating a closure plate and a portion of a spherical tank in phantom line.

FIG. 2 illustrates a manhole frame 24 having a cylindrical neck 26 and a manhole flange 28 connected to the top circular edge of neck 26. A plurality of bolts 29 having bottom-side bolt heads and topside nuts 32 are mounted through a plurality of bolt holes in manhole flange 28 and extend through mating bolt holes in a closure plate 30, all shown in phantom line. Nuts 32 are screwed onto the topside threads of bolts 29 so as to hold closure plate 30 to manhole frame 24. Manhole frame 24 is formed on a two-piece die. The bolt holes are drilled after the resin has hardened. The primary problem with manhole frame 24 is that in order to secure neck 26 to spherical tank 36, shown in phantom line, a circular support 34 must be sprayed between the outer surfaces of spherical tank 36 and neck 26. This results in significant additional labor cost to the final product. Also, it is not uncommon for loosening between neck 26 and tank 36 to develop after installation with resulting maintenance costs.

Figure 3:
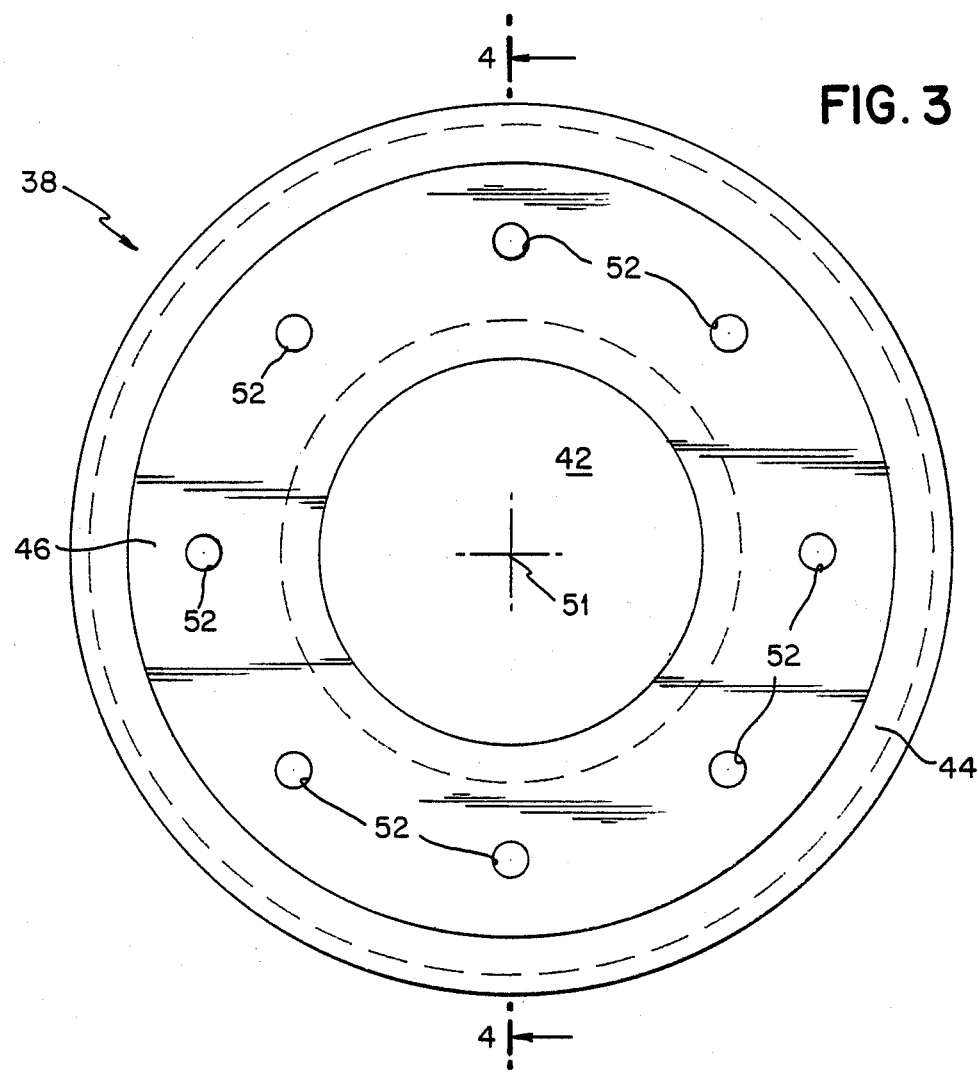
FIG. 3 is a top view of the completed manhole frame.
Figure 4:
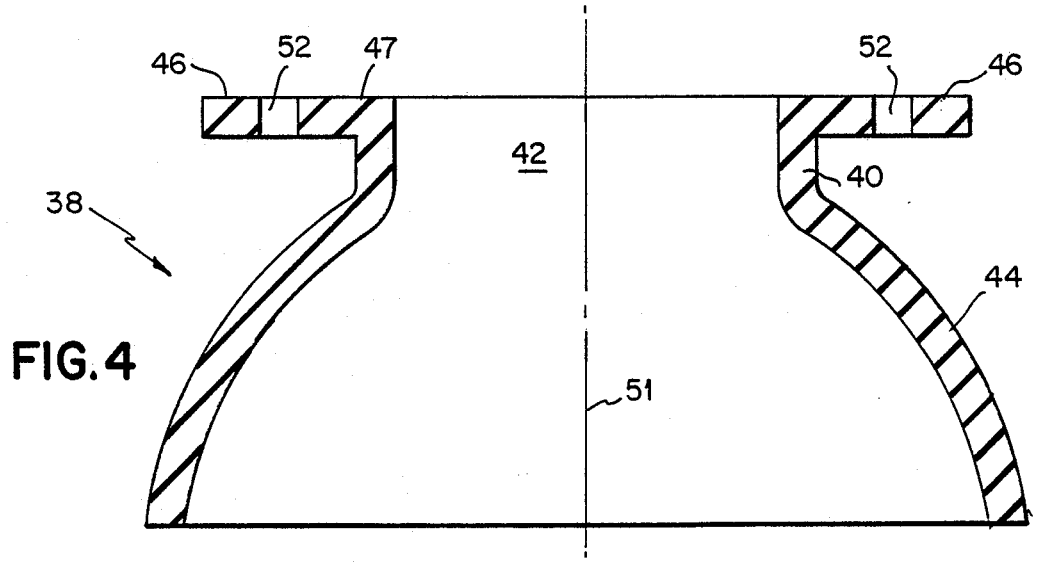
FIG. 4 is a view taken through line 4—4 in FIG. 3.

FIGS. 3 and 4 illustrate a completely formed manhole frame 38 according to the present invention that includes a cylindrical neck 40 defining an access hole, or manhole, 42, a partially spherical collar 44 connected to the circular bottom-side edge of neck 40, and an outwardly radially extending cylindrical manhole flange 46 having a circular inner edge 47 connected to the topside circular edge of neck 40. Collar 44 tapers downwardly from neck 40 in conformal integration with the spherical wall 50 of a completely formed spherical tank 48 illustrated in FIG. 5. Cylindrical manhole 42 has an axis 51 that is coextensive with a radius that extends from the center 53 of tank 48. Manhole frame 38 is integrally formed with spherical tank 48 as indicated by bracketing in FIG. 5. A plurality of equally spaced, circularly and concentrically positioned bolt holes, shown as eight bolt holes 52 for purposes of illustration, are located in manhole flange 46. The thickness of the wall of manhole flange 46 is preferably somewhat thicker than the thickness of the wall of collar 44, which is of the thickness of wall 50 of spherical tank 48 as preferably is the thickness of the wall of neck 40. Manhole frame 38 is made of a moldable, nonmetal material, preferably resin reinforced with chopped fiberglass. Other moldable, nonmetal materials that can be used include plastic materials, such as epoxy resin and polypropylene.

Completed manhole frame 38 is integrated in the formation of spherical tank 48 during a process known in the art. This process is briefly summarized as follows. Manhole frame 38 is sandblasted to produce a rough surface and is then positioned on a steel female section of an inflatable mandrel and bolted in place. An outwardly expanding chuck slips into the female steel section above and expands at a pressure to hold the inflatable mandrel. The inflated mandrel is then wound in a multi-directional process known as filament winding. A fiberglass strand roving is wetted out through a resin bath and is then directed to overlay the sandblasted collar of manhole frame 38 in multi-directional and multi-layer laminations. Manhole frame 38 then becomes an integral part of spherical tank 48. After the resin has cross-linked and hardened, the inflated mandrel is deflated and is removed through manhole 42.

A closure plate 54 illustrated in FIG. 5 bolted in place to manhole frame 38 is bolted to the topside of manhole flange 46 by bolts 56, which extend through bolt holes 52. Bolt heads 58 are preferably positioned on the bottom side of manhole flange 46, and nuts 59 are screwed onto the topside threads of bolts 56.

Figure 6:
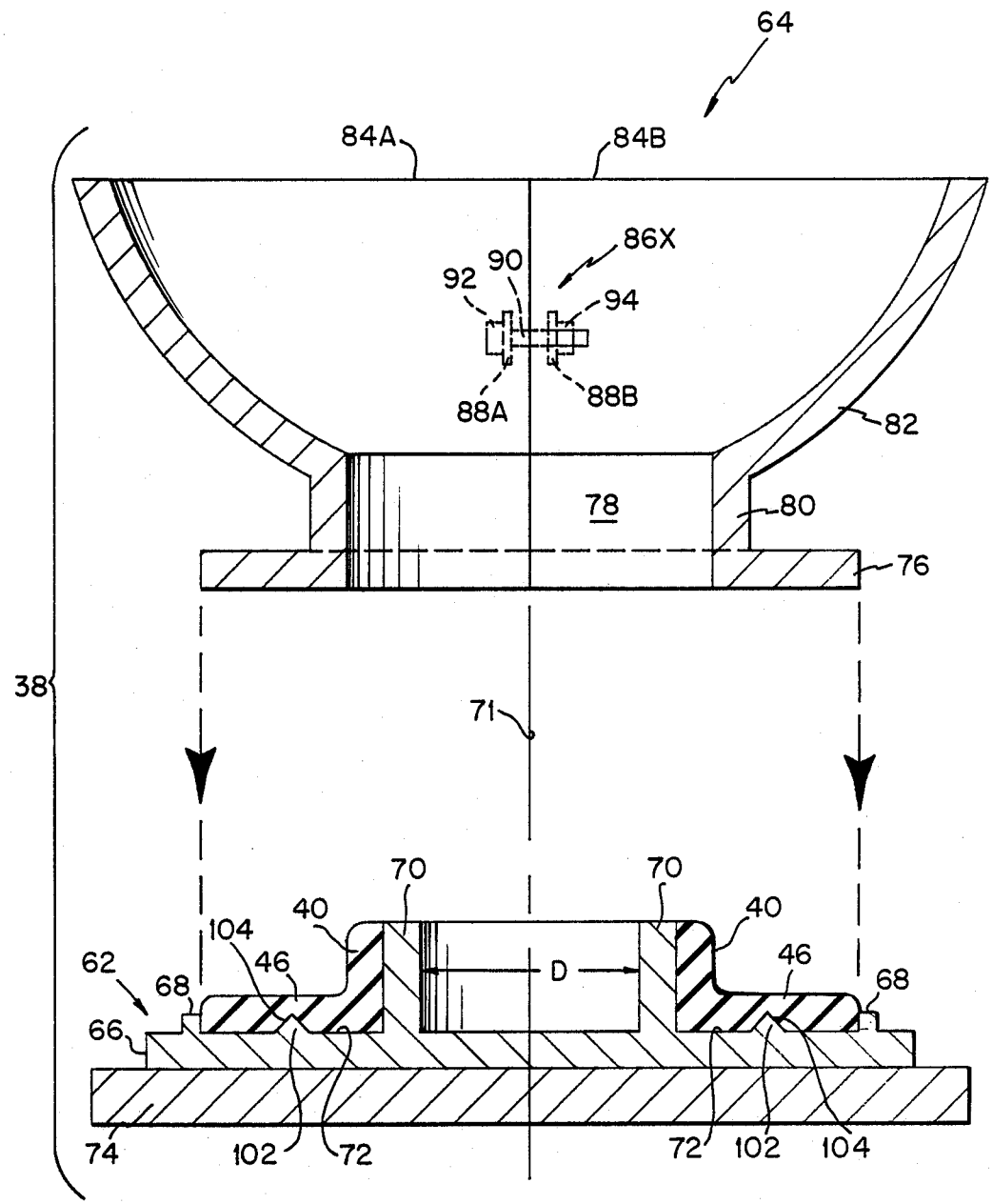
FIG. 6 is a sectional side view of a three-piece die during the forming process of a manhole frame.
Figure 8:
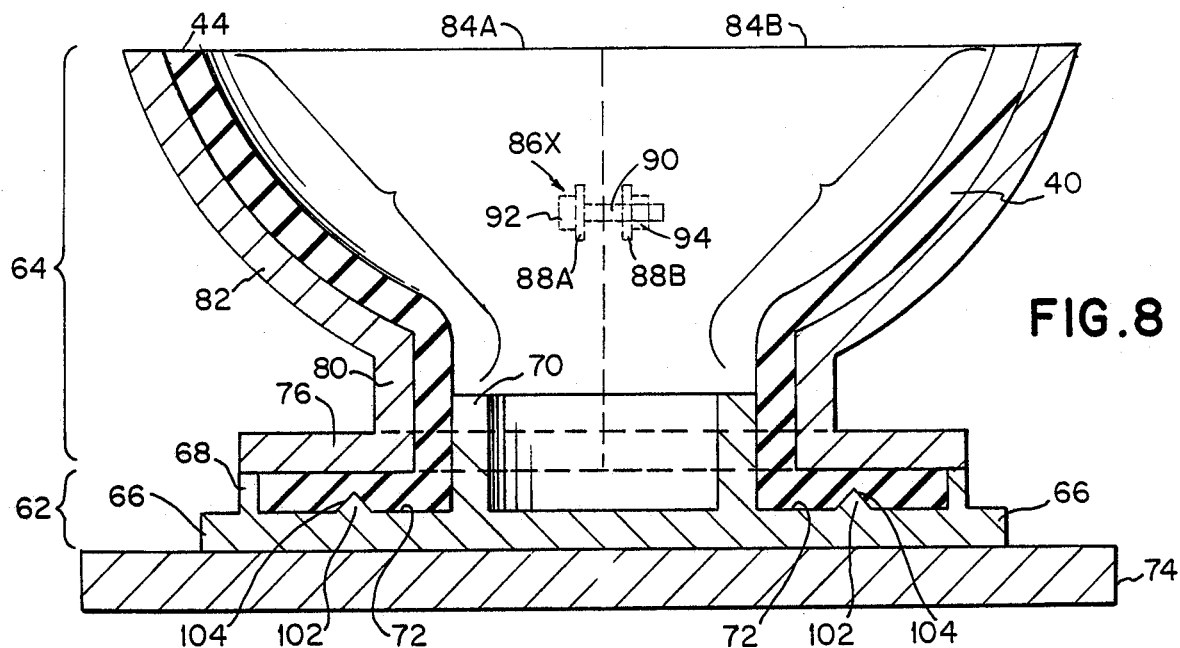
FIG. 8 is a view taken through line 8—8 of FIG. 7.
Figure 7:
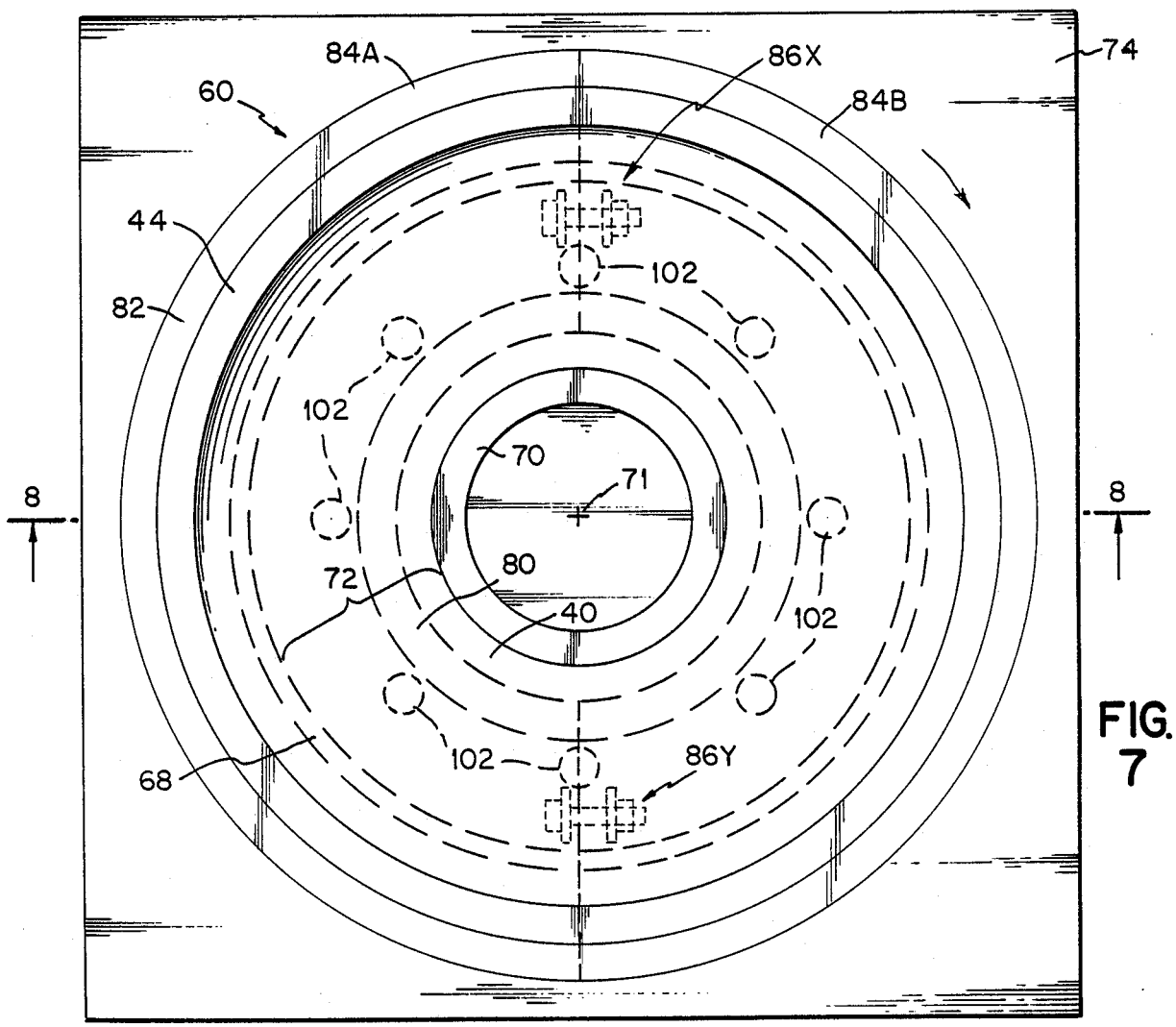
FIG. 7 is a top view of the three-piece die with the formed manhole frame between the three pieces of the die.

Manhole frame 38 can be produced on a metal three-piece die 60, which is illustrated in FIGS. 6, 7, and 8. Three-piece die 60 includes a bottom die piece 62 and a pair of top die pieces 64A and 64B adapted to be joined together in a manner to be explained to form an operational top die piece. FIG. 6 illustrates a mid-step in the production of manhole frame 38 with neck 40 and manhole flange 46 having been partially formed on bottom die piece 62 and with integrally joined top die pieces 64A and 64B in the process of descending onto bottom die piece 62.

FIGS. 7 and 8 illustrate another step in the production of manhole frame 38 with joined top die pieces 64A and 64B having been placed on top of bottom die piece 62 and collar 44 having been formed on the inner surface of upper die piece 64 so that manhole frame 38 is almost completely formed except for subsequent drilling of bolt holes 52.

Bottom die piece 62 includes a horizontal base wall 66, an outer matrix ring 68 and an inner matrix ring 70, each being centered at a common a vertical axis 71. Outer matrix ring 68 comprises an outer circular wall having an inner surface that extends vertically upwardly from base wall 66; and inner matrix ring 70 comprises an inner circular wall having an outer surface that extends vertically upwardly from base wall 66. The horizontal upper surface of base wall 66 and the inner and outer surfaces of outer and inner matrix rings 68 and 70 define a manhole flange cavity 72 in which manhole flange 46 is formed. The outer surface of inner matrix ring 70 is the forming surface for a portion of the inner surface of neck 40. The height of outer matrix ring 68 from base wall 66 is generally the same as the thickness of manhole flange 46, and the height of inner matrix ring 70 from base wall 66 is greater than that of outer matrix ring 68 and less than the axial length of neck 40. Bottom die piece 62 is set upon a rotatable table 74 operable by mechanisms and power sources not shown.

Joined top die pieces 64A and 64B include a preferably circular bottom matrix flange 76 having a circular center hole 78 having a vertical axis coextensive with axis 71, matrix flange 76 being alignable relative to generally horizontal base wall 66 of bottom die piece 68; a cylindrical matrix wall 80 having top and bottom rims, said bottom rim being connected to matrix flange 76 at the inner rim of center hole 78 and having an axis aligned with axis 71; and a curved, tapered, outwardly and upwardly dished matrix skirt 82 configured as a segmented sphere and having a bottom side connected to the top edge of cylindrical matrix wall 80. The bottom surface of matrix flange 76 is the forming surface of the bottom surface of manhole flange 46; the inner surface of cylindrical matrix wall 80 is the forming surface of the outer surface of neck 40; and the inner surface of matrix skirt 8 is the forming surface of the outer surface of collar 44. As shown in FIG. 8, joined top die pieces 64A and 64B as the operational top die piece is placed in contact with outer matrix ring 68 and is aligned with bottom die piece 62 along common axis 71. The inner surface of cylindrical matrix wall 80 of joined upper die pieces 64A and 64B is spaced from the outer surface of inner matrix ring 70 of bottom die piece 62 at a distance that is the thickness of neck 40 of manhole frame 38, that is, the height of outer matrix ring 68 relative to bottom wall 66.

Paired top die pieces 64A and 64B are of equal and opposite dimensions and are held in an assembled position ready for the molding operation by a pair of opposed die-locks 86X and 86Y connected to the outer surface of matrix skirt 82 between the top edge of skirt 82 and the top edge of neck 80. Each die-lock 86X and 86Y includes a pair of posts 88A and 88B connected to top die pieces 64A and 64B, respectively, each post having a bolt hole, a bolt 90 extending through the bolt holes, bolt 90 having a head 92 and an opposed threaded end, and a nut 94 threaded onto the threaded end of bolt 90 so as to draw and hold the particular side of top die pieces 64A and 64B tightly together, so that when both die-locks 86X and 86Y are in their locked, or bolted, modes top die pieces 64A and 64B are unified and ready for the molding process. When both die-locks 86X and 86Y are in their unlocked, or unbolted, modes, with bolts 90 removed from the posts of both die-locks 86X and 86Y, formed manhole frame 38 can be removed from three-piece die 60.

FIGS. 9A and 9B illustrate a jointed die-lock 86Z that can optionally be used in place of die-lock 86X. Die-lock 86Z includes a pair of hinge fasteners 96A and 96B, which are suitably connected to the outer surfaces of top die pieces 64A and 64B, respectively, and a pivot, or joint 100, about which top die pieces; 64A and 64B rotate between open and closed positions. Thus, only die-lock 86Y need be bolted or unbolted: when die-lock 86Y is unbolted, dies 64A and 64B can be rotated about joint 100 so as to rotate the operational top die piece from its locked, or closed, mode ready for the molding process wherein formed manhole frame 38 can be removed from three-piece die 60.

Base wall 66 of bottom die piece 62 is preferably provided with a plurality of upwardly extending conical protrusions 102 that extend into manhole flange cavity 72 and cause conical recesses 104 to be formed along the bottom side (top side when viewed in the orientation of FIG. 4) of manhole flange 46. Conical recesses 104 are located in accordance with the location of bolt holes 52 shown in FIG. 4. As will be discussed later, bolt holes 52 are formed by a drill that is directed to the proper positions by conical recesses 104.

The process of producing manhole frame 38 using three-piece die 60 includes the following steps:

(a) placing bottom die piece 6 onto rotatable table 74;

(b) preparing an operational top die piece by joining top die pieces 64A and 64B together by bolting die-locks 86X and 86Y, or by rotating top die pieces 64A and 64B together about jointed die-lock 84Z and bolting die-lock 86X;

(c) activating the rotatable table so that it slowly turns;

(d) spraying the surfaces defining manhole flange cavity 72 and the outer surface of inner matrix ring 70 with a thin layer, preferably approximately 0.10 in., of catalyzed polyester resin so that the outer surface of manhole frame 38 to be formed will have a glossy surface;

(e) spraying the surfaces defining manhole flange cavity 72 and the outer surface of inner matrix ring 70 with a liquidized nonmetal molding material; the liquidized nonmetal molding material is preferably catalyzed resin reinforced with chopped fiberglass, with application preferably made with a three spout spray gun known in the art, one spout being for applying a liquid catalyst, one spout being for applying a liquid resin, and one spout being for applying chopped fiberglass; other liquidized molding material can include plastics such as epoxy resin and polypropylene;

(f) rolling out the liquidized molding material, preferably with the use of sharp serrated circular rollers, in order to completely wet any reinforcing material and to eliminate air inclusions;

(g) repeating steps (e) and (f) until the liquidized molding material fills manhole flange cavity 72 to overflowing;

(h) deactivating the rotatable table (i) placing joined top die pieces 64A and 64B upon bottom die piece 62 centered at axis 71 so that excess liquidized molding material lying in the area of manhole flange cavity 72 is forced from bottom die piece 62 so that air inclusions are eliminated; joined top die pieces 64A and 64B are sufficiently heavy so as to force the excess liquidized molding material from bottom die piece 62;

(j) activating the rotatable table; axis 71 being aligned with axis 51 of to be formed manhole frame 38 (FIGS. 3 and 4).

(k) spraying the inner surfaces of cylindrical matrix wall 80 and skirt 82 with a thin layer, approximately 0.10 in., of catalyzed polyester resin in order to give the surface of manhole frame 38 a glossy surface;

(l) spraying the inner surfaces of cylindrical matrix wall 80 and skirt 82 with the liquidized molding material in the manner set forth in step (f);

(m) rolling out the liquidized molding material sprayed on in step (m) in order to eliminate air inclusions and in order to completely wet any reinforcing material mixed with the liquidized molding material; during rolling out the curvature of skirt 82 is followed;

(n) repeating steps (n) and (o) until the projected wall thicknesses of neck 40 and manhole 42 of projected manhole frame 38 are attained;

(o) allowing the liquidized moldable material to harden;

(p) removing bottom die piece 62 from formed manhole frame 38 by lifting joined top die pieces 64A and 64B away from bottom die piece 62 along with formed manhole frame 38;

(q) removing joined top die pieces 64A and 64B from manhole frame 38 by first unconnecting die-locks 86X and 86Y by freeing and removing bolts 90 and then pulling joined top die pieces 64A and 64B apart so as to free manhole frame 38; or when jointed die-lock 86Z is used in place of die-lock 86Y, by unsecuring die-lock 86X and rotating joined top die pieces 64A and 64B apart about jointed die-lock 86Z so as to free manhole frame 38;

(r) inverting manhole frame 38 so that flange 46 is on top and collar 44 is on the bottom; and (s) drilling bolt holes 52 through manhole flange 46 at equal circular intervals concentric around axis 51, the intervals being preferably indicated at conical recesses 104 formed by conical protrusions 102.

The surfaces defining manhole flange cavity 72 and the outer surface of inner matrix ring 70 of the joined top die and the inner surfaces of cylindrical matrix wall 80 and skirt 82 with a release agent such as teflon is performed before the steps set forth above. One spraying is sufficient for a large number of molding processes.

The embodiment of the invention particularly disclosed and described hereinabove is presented merely as an example of the invention. Other embodiments, forms, and modifications of the invention coming within the proper scope and spirit of the appended claims will, of course, readily suggest themselves to those skilled in the art.

What is claimed is:

1. A die system for making an access-hole frame for a spherical tank made of a nonmetal moldable material, the access-hole frame including a cylindrical neck having circular top and bottom edges as oriented with the spherical tank and forming a cylindrical access hole, an outwardly extending, partly spherical collar connected to the bottom edge of the neck, and a radially outwardly extending access-hole flange having top and bottom sides and connected to the top edge of the neck, the die system, comprising, in combination, a rotatable table, supporting a three-piece die, said three-piece die including:

bottom die means having an access-hole-frame flange cavity and for forming a portion of the neck of the frame upon application of the nonmetal moldable material to said bottom die means, first top die means for forming the remaining portion of the neck of the frame and for forming the collar of the frame, second top die means is removably fitted together with said first die means to form an operational top die means, for forming the remaining portion of the neck of the frame and for forming the collar of the frame, securing means for removably holding said first and second die means together as said operational top die means ready for a molding process, said operational top die means is removably fitted on top of said bottom die means subsequent to said application of the nonmetal moldable material to said bottom die means, and in conjunction with said bottom die means being for forming the remaining portion of the neck of the frame and for forming the collar of the frame upon application of said nonmetal moldable material to said operational top die means after being fitted on top of said bottom die means.

2. The die system according to claim 1, wherein said bottom die means includes a bottom die piece having a horizontal base wall, an outer matrix ring connected to said base wall, and an inner matrix ring connected to said base wall, said outer and inner matrix rings being centered at a common vertical axis, said outer matrix ring having an inner surface that extends vertically upwardly from said base wall; said inner matrix ring having an outer surface that extends vertically upwardly from said base wall; said base wall having an upper surface, said upper surface and said inner and outer surfaces of said outer and inner matrix rings defining an access-hole-flange cavity in which said access-hole flange is formed.

3. The die system according to claim 2, wherein said outer surface of said inner matrix ring is the forming surface for a portion of the inner surface of the neck of the access-hole frame.

4. The die system according to claim 3, wherein the access-hole flange has a thickness and said outer matrix ring has an outer height from said base wall, said outer height being generally the same as said thickness of the access-hole flange.

5. The die system according to claim 4, wherein the neck of the access-hole frame has an axial length, and said inner matrix ring has an inner height from said base wall greater than said outer height of said outer matrix ring and less than said axial length.

6. The die system according to claim 5, wherein said first and second die means includes first and second die pieces capable of being joined together to form said operational top die means.

7. The die system according to claim 6, wherein said operational top die means includes a circular matrix flange having a circular center hole having an axis aligned with said vertical axis, said center hole having an inner rim, said matrix flange being adapted to be placed in contact with said outer matrix ring of said bottom die piece and alignable with said horizontal base wall of said bottom die piece.

8. The die system according to claim 7, wherein said operational top die means further including a cylindrical matrix wall having top and bottom rims, said bottom rim being connected to said matrix flange at the inner rim of said center hole, said cylindrical matrix wall having an axis coextensive with said vertical axis.

9. The die system according to claim 8, wherein said neck has a thickness, said cylindrical matrix wall having an inner surface which is spaced from said outer surface of said inner matrix ring of said bottom die piece at a distance that is the thickness of said neck.

10. The die system according to claim 9, said operational top die means further including an upwardly and outwardly dished matrix skirt configured as a segmented sphere and having top and bottom sides, said bottom side being connected to said top rim.

11. The die system according to claim 10, wherein as mounted with said spherical tank said access-hole flange of said access-hole frame has a bottom surface, said neck has an outer surface, and said collar has an outer surface; and wherein said matrix flange has a bottom surface which is the forming surface of said bottom surface of said access-hole flange; wherein said cylindrical matrix wall has an inner surface which is the forming surface of said outer surface of said neck; and wherein said matrix skirt has an inner surface which is the forming surface of said outer surface of said collar.

12. The die system according to claim 2, wherein said horizontal base wall of said bottom die piece is provided with a plurality of upwardly extending conical protrusions that extend into said manhole flange cavity, wherein conical recesses are formed along the top side of said access-hole flange as oriented with the spherical tank, the protrusions being located in accordance with the location of bolt holes to be drilled through said flange.

* * * * *